US010691702B1

(12) United States Patent
Fujiki et al.

(10) Patent No.: US 10,691,702 B1
(45) Date of Patent: Jun. 23, 2020

(54) GENERATING RANKED LISTS OF ENTITIES

(71) Applicant: Google LLC, Mountain View, CA (US)

(72) Inventors: Toshiaki Fujiki, Tokyo (JP); Slaven Bilac, Cupertino, CA (US); Kavi J. Goel, San Francisco, CA (US); Shuhei Takahashi, Tokyo (JP); Tomohiko Kimura, Tokyo (JP)

(73) Assignee: Google LLC, Mountain View, CA (US)

( * ) Notice: Subject to any disclaimer, the term of this patent is extended or adjusted under 35 U.S.C. 154(b) by 252 days.

(21) Appl. No.: 15/692,772

(22) Filed: Aug. 31, 2017

Related U.S. Application Data

(63) Continuation of application No. 15/046,650, filed on Feb. 18, 2016, now abandoned, which is a continuation of application No. 13/756,117, filed on Jan. 31, 2013, now abandoned.

(60) Provisional application No. 61/593,685, filed on Feb. 1, 2012.

(51) Int. Cl.
*G06F 16/2457* (2019.01)
*G06F 16/248* (2019.01)

(52) U.S. Cl.
CPC ...... *G06F 16/24578* (2019.01); *G06F 16/248* (2019.01)

(58) Field of Classification Search
CPC .............. G06F 16/24578; G06F 16/248
USPC .......................................... 707/731
See application file for complete search history.

(56) References Cited

U.S. PATENT DOCUMENTS

| | | | |
|---|---|---|---|
| 6,785,671 B1 * | 8/2004 | Bailey | G06Q 10/02 705/5 |
| 7,007,008 B2 * | 2/2006 | Goel | G06F 16/951 707/768 |
| 7,350,187 B1 | 3/2008 | Tong et al. | |
| 7,430,561 B2 | 9/2008 | Bailey et al. | |
| 7,698,330 B2 * | 4/2010 | Kim | G06F 16/90324 707/727 |
| 7,818,176 B2 * | 10/2010 | Freeman | G06Q 30/0241 704/270 |
| 7,908,289 B2 * | 3/2011 | Ellis | G06F 16/951 707/769 |
| 8,006,197 B1 * | 8/2011 | Nevill-Manning | G06F 16/9577 715/788 |
| 8,260,786 B2 * | 9/2012 | DeCoste | G06Q 30/02 707/748 |
| 2012/0022857 A1 * | 1/2012 | Baldwin | G10L 15/22 704/9 |
| 2016/0148612 A1 * | 5/2016 | Guo | G06F 17/27 704/257 |

* cited by examiner

*Primary Examiner* — Joshua Bullock
(74) *Attorney, Agent, or Firm* — Fish & Richardson P.C.

(57) ABSTRACT

A device may be configured to receive a query; receive information regarding documents that are relevant to the query; identify one or more entities associated with the documents; determine a category for the query based on: the query, a topic of the documents, and the one or more entities; determine, based on the query and the category, that an entity list should be presented in response to the query; and present a search result document based on determining that the entity list should be presented in response to the query. The search result document may include a list with information identifying the one or more entities.

15 Claims, 11 Drawing Sheets

140

| best movies of 2010 | |

Web results for "best movies of 2010":

50 Best Movies of 2010 - The Moviefone Blog
blog.moviefone.com/2010/09/01/best-movies-of-2010/
Sep 1, 2010 – Much has been debated about the quality of the top movies released this year, but that we were able to pull together a list of the 50 best movies ...

The best feature films of 2010 - Roger Ebert's Journal
blogs.suntimes.com/ebert/2010/.../the_best_feature_films_of_2010.ht...
Dec 17, 2010 – The best feature films of 2010. By Roger Ebert on December 17, 20108:30 AM | 466 Comments. 12.jpg David Fincher's "The Social Network"is emerging as the ...

Newsweek's David Ansen Names Top 10 Movies of 2010 - The ...
www.thedailybeast.com/.../2010/12/21/the-best-movies-of-2010.html
Dec 21, 2010 – This year will not be remembered as a vintage one for movies, but it was better than most people will ever know. Unless you were in the ...

Top Movies - Best Movies of 2011 and All Time - Rotten Tomatoes
www.rottentomatoes.com/top/
Tomatometer rankings of the top 100 best movies of 2011, 2010 and all time. Lists of recent good movies and award winners.

IMDb: Highest Rated Feature Films Released In 2010 With At Least ...
www.imdb.com/search/title?year=2010,2010&title...
In Theaters; Coming Soon; Top Movies; Showtimes & Tickets; Trailers; Watchlist ...Highest Rated Feature Films Released In 2010 With At Least 1000 Votes ...

FIG. 1B

145 best movies of 2010

Found 391 results from category: "movies"

110

Toy Story 3    Inception    The Social Network

115

        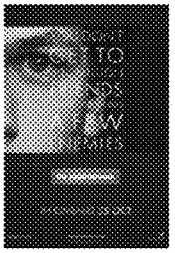

Release date:   Release date:   Release date:
June 18, 2010   July 16, 2010   October 1, 2010

See more results from category: "movies" ← 150

Web results for "best movies of 2010":

50 Best Movies of 2010 - The Moviefone Blog
blog.moviefone.com/2010/09/01/best-movies-of-2010/
Sep 1, 2010 – Much has been debated about the quality of the top movies released this year, but that we were able to pull together a list of the 50 best movies ...

The best feature films of 2010 - Roger Ebert's Journal
blogs.suntimes.com/ebert/2010/.../the_best_feature_films_of_2010.ht...
Dec 17, 2010 – The best feature films of 2010. By Roger Ebert on December 17, 2010 8:30 AM | 466 Comments. 12.jpg David Fincher's "The Social Network" is emerging as the ...

Newsweek's David Ansen Names Top 10 Movies of 2010 - The ...
www.thedailybeast.com/.../2010/12/21/the-best-movies-of-2010.html
Dec 21, 2010 – This year will not be remembered as a vintage one for movies, but it was better than most people will ever know. Unless you were in the ...

Top Movies - Best Movies of 2011 and All Time - Rotten Tomatoes
www.rottentomatoes.com/top/
Tomatometer rankings of the top 100 best movies of 2011, 2010 and all time. Lists of recent good movies and award winners.

IMDb: Highest Rated Feature Films Released In 2010 With At Least ...
www.imdb.com/search/title?year=2010,2010&title...
In Theaters; Coming Soon; Top Movies; Showtimes & Tickets; Trailers; Watchlist ...Highest Rated Feature Films Released In 2010 With At Least 1000 Votes ...

FIG. 1C

GENERATING RANKED LISTS OF ENTITIES

RELATED APPLICATION

This application is a continuation of U.S. application Ser. No. 15/046,650, filed Feb. 18, 2016, which is a continuation of U.S. application Ser. No. 13/756,117, filed Jan. 31, 2013, which claims the benefit of U.S. Provisional Application No. 61/593,685, filed Feb. 1, 2012, the contents of each of which are hereby incorporated by reference.

BACKGROUND

The World Wide Web ("web") contains a vast amount of information. A search engine may assist a user in locating information, such as a web page, that is relevant to a search query. When a user enters a search query, such as "top 10 movies of 2010," the search engine may provide information regarding several web pages that are relevant to the search query. For instance, the search engine may provide links to several web pages that include lists of the top movies of 2010.

SUMMARY

According to some possible implementations, a method may include receiving, by one or more server devices, a query; receiving, by at least one of the one or more server devices, information regarding documents that are relevant to the query; identifying, by at least one of the one or more server devices, one or more entities associated with the documents; determining, by at least one of the one or more server devices, a category for the query based on: the query, a topic of documents, and the one or more entities; determining, by at least one of the one or more server devices and based on the query and the category, that an entity list should be presented in response to the query; and presenting, by at least one of the one or more server devices, a search result document based on determining that the entity list should be presented in response to the query. The search result document may include a list with information identifying the one or more entities.

According to some possible implementations, determining the category may include generating a score based on whether the query includes one or more terms that are associated with the category, where determining the category may be based on the generated score.

According to some possible implementations, determining the category may include generating a score based on at least one of a quantity or a proportion of the documents that are associated with a topic that is associated with the category, where determining the category may be based on the generated score.

According to some possible implementations, determining the category may include generating a score based on at least one of a quantity or a proportion of entities, of the one or more entities, that are associated with the category, where determining the category may be based on the generated score.

According to some possible implementations, determining that the entity list should be presented in response to the query may include generating a score based on whether the query includes one or more blacklisted terms, where determining that the entity list should be presented in response to the query may be based on the generated score.

According to some possible implementations, the method may further include ranking the one or more entities, where the search result document may include information regarding the one or more entities in an order that is based on the ranking.

According to some possible implementations, ranking the one or more entities may include generating a score for each of the one or more entities, where the score for a particular entity, of the one or more entities, may be based on at least one of: a relevance of the particular entity to a particular document, of the documents, that includes information regarding the particular entity, a relevance of the particular document to the query, or whether an attribute, associated with the particular entity, matches one or more terms of the query; and ranking the one or more entities are based on the scores of the one or more entities.

According to some possible implementations, a device may include one or more memory devices to store computer-executable instructions, and one or more processors to execute the computer-executable instructions to: receive a query; receive information regarding documents that are relevant to the query; identify one or more entities associated with the documents; determine a category for the query based on the query, a topic of the documents, and the one or more entities; determine, based on the query and the category, that an entity list should be presented in response to the query; and present a search result document based on determining that the entity list should be presented in response to the query. The search result document may include a list with information identifying the one or more entities.

According to some possible implementations, the one or more processors, when determining the category, may generate a score based on at least one of a quantity or a proportion of the documents that are associated with a topic that is associated with the category, where the category may be based on the generated score.

According to some possible implementations, the one or more processors, when determining the category, may generate a score based on at least one of a quantity or a proportion of entities, of the one or more entities, that are associated with the category, where the category may be based on the generated score.

According to some possible implementations, the one or more processors, when determining that the entity list should be presented in response to the query, may generate a score based on whether the query includes one or more blacklisted terms, where determining that the entity list should be presented in response to the query may be based on the generated score.

According to some possible implementations, the one or more processors, when determining that the entity list should be presented in response to the query, may generate a score based on whether the category is one of a blacklisted category or an approved category, where determining that the entity list should be presented in response to the query may be based on the generated score.

According to some possible implementations, the one or more processors, when determining that the entity list should be presented in response to the query, may generate a score based on whether the query includes one or more terms that are associated with the entity list, where determining that the entity list should be presented in response to the query may be based on the generated score.

According to some possible implementations, the search result document may further include information identifying one or more attributes associated with the one or more entities.

According to some possible implementations, a computer-readable medium may include one or more computer-executable instructions, which, when executed by one or more processors, cause the one or more processors to: receive a query; receive information regarding one or more documents that are relevant to the query; identify one or more entities associated with the documents; determine a category for the query based on the query, topics of the documents, and the one or more entities; determine, based on the query and the category, that an entity list should be presented in response to the query; and present a search result document based on determining that the entity list should be presented in response to the query. The search result document may include a list with information identifying the one or more entities.

According to some possible implementations, the computer-executable instructions, which cause the one or more processors to determine the category, may cause the one or more processors to generate a score based on whether the query includes one or more terms that are associated with the category, where the category may be based on the generated score.

According to some possible implementations, the computer-executable instructions, which cause the one or more processors to determine the category, may cause the one or more processors to generate a score based on at least one of a quantity or a proportion of entities, of the one or more entities, that are associated with the category, where the category may be based on the generated score.

According to some possible implementations, the computer-executable instructions, which cause the one or more processors to determine that the entity list should be presented in response to the query, may cause the one or more processors to generate a score based on whether the query includes one or more terms that are associated with the entity list, where the determination that the entity list should be presented in response to the query may be based on the generated score.

According to some possible implementations, the computer-executable instructions may further cause the one or more processors to generate a score for each of the one or more entities, where the score for a particular entity, of the one or more entities, may be based on at least one of: a relevance of the particular entity to a particular document, of the documents, that includes information regarding the particular entity, a relevance of the particular document to the query, or whether an attribute, associated with the entity, matches one or more terms of the query; and rank the one or more entities based on the scores of the one or more entities. The search result document may include information regarding the one or more entities in an order that is based on the ranking.

According to some possible implementations, the search result document may further include links to one or more of the documents that are relevant to the query.

The above discussion mentions examples in which some implementations may be implemented via one or more methods performed by one or more processors of one or more devices. In some implementations, one or more systems and/or one or more devices may be configured to perform one or more of the acts mentioned above. In some implementations, a computer-readable medium may include computer-executable instructions which, when executed by one or more processors, cause the one or more processors to perform one or more of the acts mentioned above.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIGS. 1A-1C illustrate an overview of an example implementation described herein;

DETAILED DESCRIPTION

The following detailed description refers to the accompanying drawings. The same reference numbers in different drawings may identify the same or similar elements.

The concepts described herein may be applied to sets of documents. A document may be broadly interpreted to include any machine-readable and machine-storable work product. A document may include, for example, an e-mail, a web site, a file, a combination of files, one or more files with embedded links to other files, a news group posting, a news article, a blog, a business listing, an electronic version of printed text, a web advertisement, etc. In the context of the Internet, a common document is a web page. Documents often include textual information and may include embedded information, such as meta information, images, hyperlinks, etc., and/or embedded instructions, such as Javascript, etc.

As used herein, an entity may refer to an instance of information that may be categorized and/or listed. A document may include information regarding one or more entities. For example, a document may include text, images, etc., regarding one or more entities. An entity may be extracted and/or identified from a document by comparing the text, images, etc., to a repository that includes information regarding entities. For example, one entity may be associated with the movie "Toy Story 3," another entity may be associated with the song "Party Rock Anthem," another entity may be associated with the book "Hitchhiker's Guide to the Galaxy," etc. As mentioned above, entities may be categorized. For example, one category of entities may include "movies," another category of entities may include "songs," another category of entities may include "books," etc.

Figure 1A:
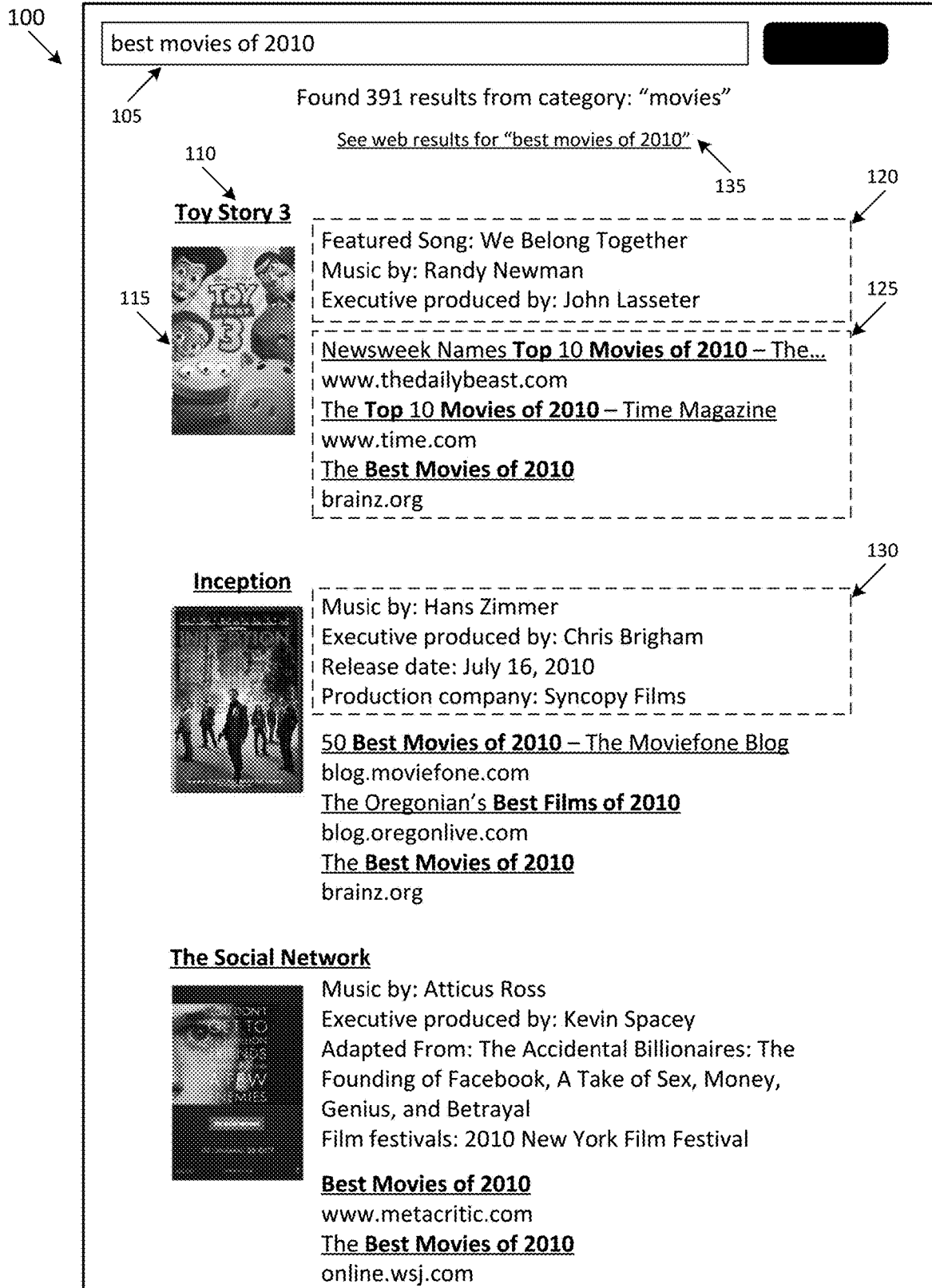

A system and/or method, described herein, may enable one or more devices, such as one or more server devices implementing a search engine, to present lists of entities in response to a search query that is associated with a category related to entities. FIG. 1A illustrates an example user interface 100 according to one or more implementations described herein. User interface 100 may represent a search result document presented by a search engine in response to a search query, such as search query 105—"best movies of 2010." The search engine may present user interface 100 in response to the search engine determining that search query 105 is associated with a category, with which entities may be associated. Thus, user interface 100 may include a list of entities that are relevant to search query 105.

Specifically, for example, the search engine may determine that search query 105 is associated with the category "movies." Thus, as shown in FIG. 1A, user interface 100 may include information regarding one or more entities associated with the category "movies." For example, user interface 100 may present information regarding movies that were released in the year 2010, such as "Toy Story 3," "Inception," and "The Social Network." User interface 100 may further include additional information regarding these movies. For example, for Toy Story 3, user interface 100 may include link 110 to a search result document that includes information regarding search results associated with the movie, image 115 associated with the movie, information regarding a set of attributes 120 associated with the movie, and information 125 associated with one or more search results associated with the movie.

A selection of link 110 may cause the search engine to provide another search result document that includes information regarding documents that are relevant to the query "Toy Story 3." In one implementation, a selection of link 110 may cause the search engine to execute a search for the query "Toy Story 3," and present information regarding documents that are relevant to the query. Image 115 may include an image associated with the movie name. For example, image 115 may be an image of a movie poster associated with the movie. In one implementation, image 115 may be retrieved by executing an image search for the name of the movie. Additionally, or alternatively, image 115 may be stored in a repository that associates the movie with the image.

Attribute information 120 may include information regarding the movie Toy Story 3. For example, attribute information 120 may include information identifying a featured song from the movie, information identifying a music credit associated with the movie, information identifying an executive producer credit associated with the movie, etc. Information 125 may include information associated with documents that are associated with the movie. For example, the information may identify titles of the documents, links to the documents, domains associated with the documents, etc. In one implementation, the documents may be documents that identified based on a search that is executed based on the name of the movie. Additionally, or alternatively, a repository may store information associating the documents with the movie.

As further shown in FIG. 1A, user interface 100 may include different attributes for different movies. For instance, attribute information 130, associated with the movie "Inception," may include information identifying a music credit associated with the movie, an executive producer credit associated with the movie, a release date associated with the movie, a production company associated with the movie, etc.

As described further below, the entities may be presented in a particular ranked order. In one implementation, a user may be able to specify another order for the entities to be presented. For example, a user may select—e.g., click—a particular attribute, such as "featured song." In response to receiving the selection, the search engine may reorder the entities based on featured songs. In one implementation, the search engine may present the reordered entities based on an alphabetical order of the featured songs, a reverse alphabetical order of the featured songs, etc.

User interface 100 may also include an option 135 to access web results for search query 105. A selection of option 135 may cause the search engine to present another user interface, described further below with respect to FIG. 1B, which includes information regarding web results for search query 105.

In one implementation, the search engine may present user interface 100 in lieu of presenting a user interface that includes information identifying web results that are relevant to the search query. Additionally, or alternatively, as discussed above, the search engine may present user interface 140 in response to receiving a selection of option 135. For example, the search engine may present user interface 100 in lieu of presenting user interface 140, shown in FIG. 1B. User interface 140 may include information identifying a set of documents that are identified as being relevant to the search query "best movies of 2010." This set of documents may be referred to as web results. These web results may include information identifying, for example, multiple documents that each includes information relating to the best movies of 2010.

In another implementation, the search engine may present user interface 145, shown in FIG. 1C, when presenting search results in response to query 105. User interface 145 may include information regarding one or more entities that are relevant to search query 105, as well as information regarding one or more web results that are relevant to search query 105. For example, user interface 145 may include images and links associated with one or more of the entities. Additionally, or alternatively, user interface 145 may also include other information associated with entities, such as attribute information—e.g., release date, music credit, producer credit, production company, or the like. As shown in FIG. 1C, user interface 145 may include, for instance, link 110 and image 115 associated with Toy Story 3, as well as links and images respectively associated with Inception and The Social Network.

In one implementation, user interface 145 may also include option 150. A selection of option 150 may cause the search engine to present a user interface that includes more information regarding the entities than is included in user interface 145, such as attribute information. Additionally, or alternatively, a selection of option 150 may cause the search engine to present a user interface that includes information regarding a greater quantity of entities than a quantity of entities for which information is included in user interface 145. For example, a selection of option 150 may cause the search engine to present user interface 100.

By presenting information regarding entities, associated with a particular category, in response to a search query that is associated with the particular category, a search engine may more efficiently provide relevant information to a user. Specifically, for example, if a user desires a list of the best movies of 2010, a search engine may provide a list of the best movies of 2010, instead of providing a list of search results, which may each include information regarding the best movies of 2010. Additionally, a search engine may provide information, such as attribute information associated with the entities, that the user is interested in viewing.

Figure 2:
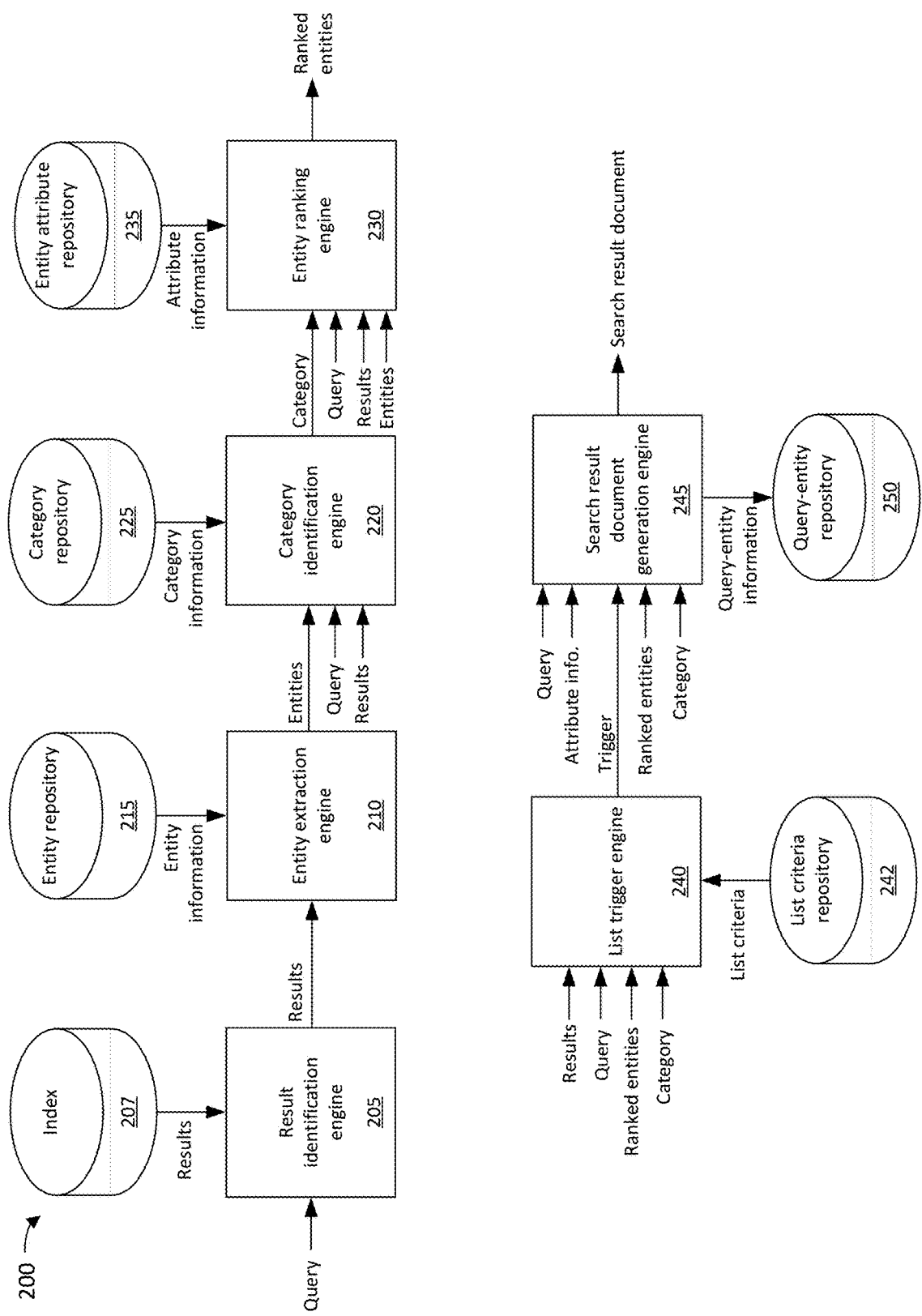
FIG. 2 illustrates an example system according to one or more implementations described herein.

FIG. 2 illustrates an example system 200 according to one or more implementations described herein. Example system 200 may include result identification engine 205, index 207, entity extraction engine 210, entity repository 215, category identification engine 220, category repository 225, entity ranking engine 230, entity attribute repository 235, list trigger engine 240, search result document generation engine 245, and query-entity repository 250. In other implementations, system 200 may include fewer components, additional components, or different components. Additionally, one or more components shown in FIG. 2 may perform the functions of one or more other components shown in FIG. 2.

Result identification engine 205 may receive a query, and may identify a set of results that are relevant to the query. The results may include a set of documents, such as web pages, news articles, image results, blog documents, or the like. Result identification engine 205 may receive the results from index 207. Index 207 which may store information regarding documents, such as titles, location identifiers, content associated with documents, etc.

Entity extraction engine 210 may analyze the results to determine whether the results are associated with one or more entities. In other words, entity extraction engine 210 may extract entities from the results. For example, entity extraction engine 210 may compare terms included in the results to terms stored by entity repository 215. Entity repository 215 may, for instance, store information identifying entities, such as names of entities, terms associated with entities, etc. Entity extraction engine 210 may store information associating results with entities. For example, entity extraction engine 210 may store information identifying that particular terms associated with the results, which match terms stored by entity repository 215, are associated with particular entities.

For example, entity extraction engine 210 may identify that one of the results are a document that includes the phrase "Toy Story 3." Entity extraction engine 210 may compare the phrase "Toy Story 3" to information stored in entity repository 215 to determine that the phrase "Toy Story 3" is associated with an entity associated with the movie Toy Story 3.

Category identification engine 220 may identify a category associated with the query. For example, category identification engine 220 may receive information identifying one or more categories from category repository 225. The information may include an identification of one or more categories, as well as terms associated with the one or more categories. For example, the information may include an identification of a "movies" category, and information associating the terms "film," "films," and "movie" with the "movies" category. Based on this information, as well as one or more other factors, category identification engine 220 may identify the category associated with the query.

One such factor may include whether the query includes a term associated with a particular category. For example, category identification engine 220 may identify that a query, that includes the term(s) "film" and/or "movie," is associated with a "movies" category.

Another factor may include a quantity and/or proportion of results, of the results received by result identification engine 205, that are associated with a topic that is associated with a particular category. For example, category identification engine 220 may identify that 75% of the results, received by result identification engine 205, are associated with a "movies" and/or a "films" topic. Category identification 220 may further identify that the "movies" and "films" topics are associated with a "movies" category. Thus, category identification engine 220 may identify that 75% of the results, received by result identification engine 205, are associated with a "movies" category.

In order to identify the topic of a particular result, category identification engine 220 may analyze the result in order to determine the topic. For example, category identification engine 220 may determine the topic of the result based on content of the result. Additionally, or alternatively, category identification engine 220 may receive topic information that identifies one or more topics associated with the result. Furthermore, category identification engine 220 may receive category information that associates categories with topics. For example, the category information may identify that a "movies" topic is associated with a "movies" category. Additionally, or alternatively, the category information may identify one or more categories associated with results. Category identification engine 220 may receive the topic information from index 207, and/or from any other component, while category identification engine 220 may receive the category information from category repository 225, and/or from any other component.

Yet another factor may include a quantity and/or proportion of entities, of the entities identified by entity extraction engine 210, that are associated with a particular category. For example, category identification engine 220 may identify that 85% of the entities, identified by entity extraction engine 210, are associated with the "movies" category. In order to identify the category associated with a particular entity, category identification engine 220 may receive category information that includes an identification of one or more categories associated with the entity. For example, the category information may identify that entities associated with the movies Toy Story 3, Inception, and/or The Social Network are associated with a "movies" category. In one implementation, one entity may be associated with multiple categories. For example, an entity associated with "Jurassic Park" may be associated with both a "books" category and a "movies" category. Category identification engine 220 may receive the category information from category repository 225, and/or from any other component.

Entity ranking engine 230 may rank the entities identified by entity extraction engine 210. When ranking the entities, entity ranking engine 230 may generate a score for two or more of the entities, and rank the entities based on the scores. The score for a particular entity may be based on one or more factors.

One such factor for scoring a particular entity may include a relevance of the particular entity to a result from which the entity was extracted. In one implementation, entity ranking engine 230 may determine the relevance of the particular entity based on a topic associated with the result from which the entity was extracted. In order to determine the topic associated with the result, entity ranking engine 230 may analyze the result. Additionally, or alternatively, entity ranking engine 230 may receive information identifying the topic associated with the result from index 207, or from any other component.

For example, assume that a first entity associated with the movie Toy Story 3 is extracted from a document with a topic relating to "football," while a second entity associated with the movie Inception is extracted from a document with a topic relating to "movies." Entity ranking engine 230 may determine that the first entity has a lower relevance to the result from which the first entity was extracted than the relevance of the second entity to the result from which the second entity was extracted.

Additionally, or alternatively, entity ranking engine 230 may determine the relevance of the particular entity to the result using any other technique. For example, entity ranking engine 230 may determine the relevance of the particular entity to the result based on relevance of terms, included in the result, to the particular entity, etc.

Another factor for scoring a particular entity may include a relevance of a result, from which the particular entity is extracted, to the query. Entity ranking engine 230 may, for example, determine the relevance of the result to the query by identifying an information retrieval ("IR") score of the result with respect to the query. In one implementation, entity ranking engine 230 may generate the IR score. Additionally, or alternatively, entity ranking engine 230 may receive the IR score from result identification engine 205, or from any other component.

Yet another factor for scoring a particular entity may include whether the query includes a term associated with an attribute, associated with the particular entity. Entity ranking engine 230 may receive information identifying attributes associated with the particular entity from entity attribute repository 235, which may store information identifying entities with attributes. Attributes for the particular entity may include, for example, detailed information regarding the particular entity.

Assume, for example, that the particular entity is associated with a "movies" category. In this example, the attributes may include information, such as release date, lead actor(s) and/or lead actress(es), supporting actor(s) and/or actress(es), box office gross, executive producer credit, music credit, a synopsis and/or summary associated with the movie, etc. In other examples, entities associated with different categories may be associated with a different set of attributes. Further assume that the particular entity is associated with Toy Story 3, a movie released in 2010, and that the query includes the term "2010." Thus, entity ranking engine 230 may identify that the query is associated with a release date attribute associated with the particular entity.

List trigger engine 240 may determine whether the query is associated with an entity list. In other words, list trigger engine 240 may determine whether a search result document that lists entities should be presented in response to the query. List trigger engine 240 may base the determination on list criteria received from list criteria repository 242 and/or one or more factors.

One such factor may include whether the query includes one or more blacklisted terms. The list criteria, received from list criteria repository 242, may identify the one or more blacklisted items. For example, list trigger engine 240 may determine whether the query includes one or more terms that have been identified as offensive, relating to adult content, etc.

Another factor may include whether the category, identified by category identification engine 220, is included in a set of approved categories associated with entity lists. Additionally, or alternatively, list trigger engine 240 may determine whether the category is included in a set of blacklisted categories. The list criteria, received from list criteria repository 242, may identify the approved categories and/or the blacklisted categories.

Yet another factor may include whether the query is associated with entity lists. In such an implementation, list trigger engine 240 may receive list criteria, from list criteria repository 242, indicating that phrases, such as "top," "of 2010," "best," "best of," or the like, may be associated with entity lists. List trigger engine 240 may determine whether the query includes one or more of the phrases indicated by the received list criteria.

Still another factor may be based on results, such as the results identified by result identification engine 205. In such an implementation, list trigger engine 240 may determine whether at least a threshold quantity of results were identified by result identification engine 205. Additionally, or alternatively, list trigger engine 240 may determine whether at least a threshold quantity of results, identified by result identification engine 240, are associated with a particular category, such as the category identified by category identification engine 220. In one implementation, list trigger engine 240 may determine whether at least a threshold quantity of results, out of a particular quantity of the top results identified by result identification engine 240, are associated with the particular category.

Yet another factor may be based on entities, such as the entities identified by entity extraction engine 210 and/or the entities ranked by entity ranking engine 230. In such an implementation, list trigger engine 240 may determine whether at least a threshold quantity of entities was identified by entity extraction engine 210. Additionally, or alternatively, list trigger engine 240 may determine whether at least a threshold quantity of quantities, identified by entity extraction engine 210, are associated with a particular category, such as the category identified by category identification engine 220. In one implementation, list trigger engine 240 may determine whether at least a threshold quantity of entities, out of a particular quantity of the top entities identified by entity ranking engine 230, are associated with the particular category.

List trigger engine 240 may output a trigger based on determining whether the query is associated with an entity list. For example, when list trigger engine 240 determines that the query is associated with an entity list, the trigger may indicate that the query is associated with an entity list. On the other hand, when list trigger engine 240 determines that the query is not associated with an entity list, the trigger may indicate that the query is not associated with an entity list.

Search result document generation engine 245 may generate a search result document for presentation at a client, such as a client from which the query was received. For example, when the trigger, output by list trigger engine 240, indicates that the query is associated with an entity list, search result document generation engine 245 may generate a search result document that includes information regarding the identified entities. The search result document may include some or all of the elements described above with respect to user interfaces 100 and/or 145. If, on the other hand, the trigger, output by list trigger engine 240, indicates that the query is not associated with an entity list, search result document generation engine 245 may generate a search result document that includes web results that are relevant to the query. In such an example, the search result document may not include information regarding the entities, and may include some or all of the elements described above with respect to user interface 140.

Additionally, or alternatively, search result document generation engine 245 may output information associating some or all of the query with the ranked entities. For example, search result document generation engine 245 may provide the information to query-entity repository 250. In one implementation, this information may be used when presenting ranked entities in response to one or more subsequent search queries that include some or all of the terms of the query received by result identification engine 205.

Figure 3:
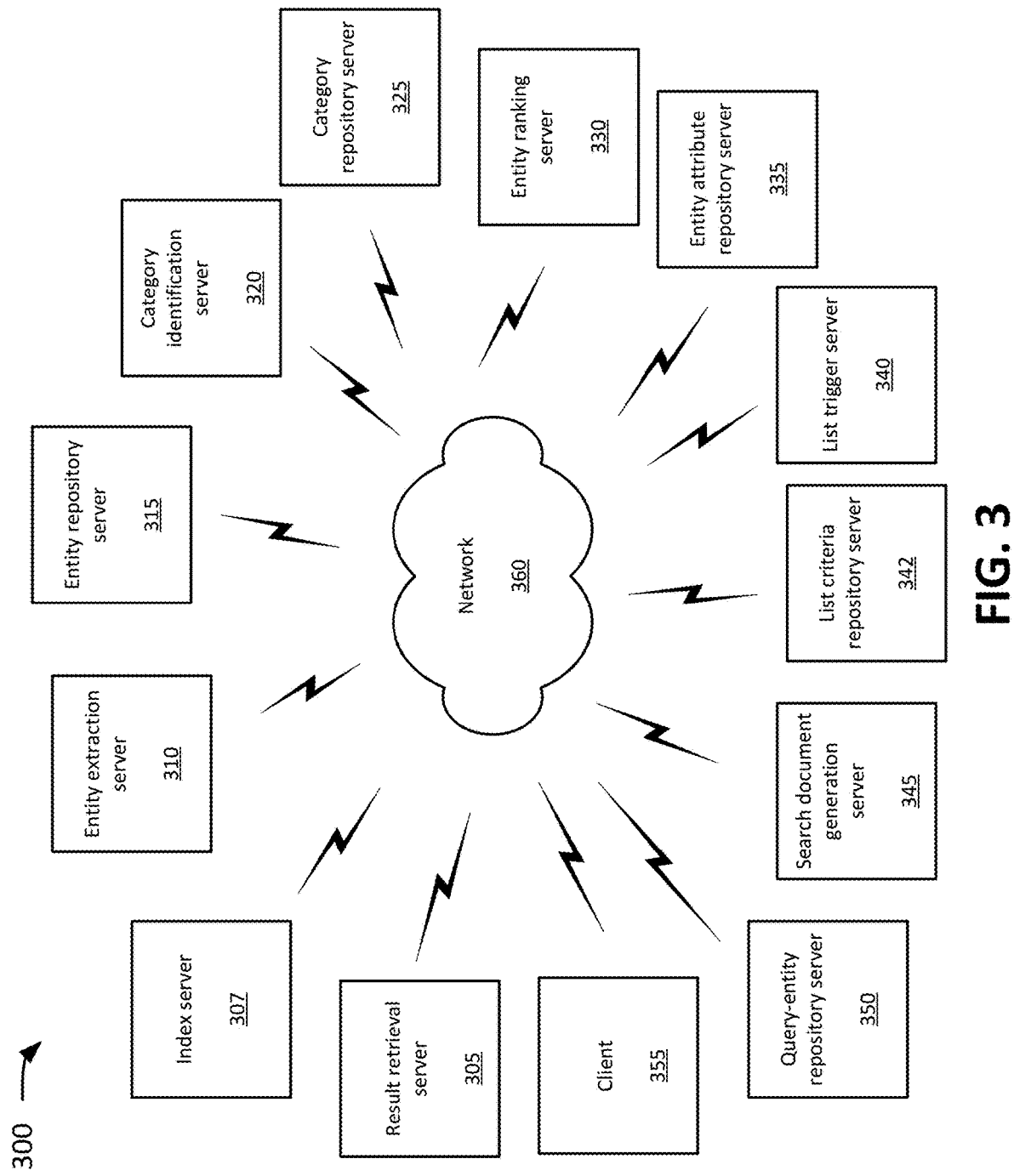
FIG. 3 illustrates an example environment in which systems and/or methods described herein may be implemented.

FIG. 3 is a diagram of an example environment 300 in which systems and/or methods described herein may be implemented. Environment 300 may include multiple servers 305-350 and client 355 connected to network 360. Twelve servers 305-350 and one client 355 have been illustrated as connected to network 360 for simplicity. In practice, environment 300 may include additional clients and/or servers or fewer clients and/or servers. While servers 305-350 are shown as separate components, it may be possible for one or more of servers 305-350 to perform one or more of the functions of another one or more of servers 305-350. Also, in some instances, a client may perform a function of a server, and a server may perform a function of a client.

Each server 305-350 may be implemented as a single server device or a collection of server devices that may be co-located or remotely located. Additionally, or alternatively, any two or more of servers 305-350 may be implemented within a single, common server device or a single, common collection of server devices.

Servers 305-350 may include server devices that gather, process, search, and/or implement functions in a manner described herein. One or more of servers 305-350 may perform functions described with respect to one or more components described with respect to FIG. 2. For example, server 305 may implement functionality described with respect to result identification engine 205, server 307 may implement functionality described with respect to index 207, server 310 may implement functionality described with respect to entity extraction engine 210, server 315 may implement functionality described with respect to entity repository 315, server 320 may implement functionality described with respect to category identification engine 220, server 325 may implement functionality described with respect to category repository 225, server 330 may implement functionality described with respect to entity ranking engine 230, server 325 may implement functionality described with respect to entity attribute repository 235, server 340 may implement functionality described with respect to list trigger engine 240, server 342 may implement functionality described with respect to list criteria repository 242, server 345 may implement functionality described with respect to search result document generation engine 245, and server 350 may implement functionality described with respect to query-entity repository 250.

Additional servers, implementing other functions, although not explicitly shown, may also be implemented in environment 300. The additional servers may provide, for example, web content, payment services, shopping services, social networking services, etc.

Client 355 may include a client device, such as personal computer, a wireless telephone, a personal digital assistant ("PDA"), a tablet computer, a laptop, or another type of computation or communication device. Client 355 may include user interfaces, such as user interfaces 100, 140, and/or 145, presented through one or more browsers, e.g., web browsers, such as CHROME™.

Network 360 may include any type of network, such as a local area network ("LAN"), a wide area network ("WAN"), a telephone network—e.g., the Public Switched Telephone Network ("PSTN") or a cellular network—an intranet, the Internet, or a combination of networks. Servers 305-350 and client 355 may connect to network 360 via wired and/or wireless connections. In other words, any one of servers 305-350 or client 355 may connect to network 360 via a wired connection, a wireless connection, or a combination of a wired connection and a wireless connection.

Figure 4:
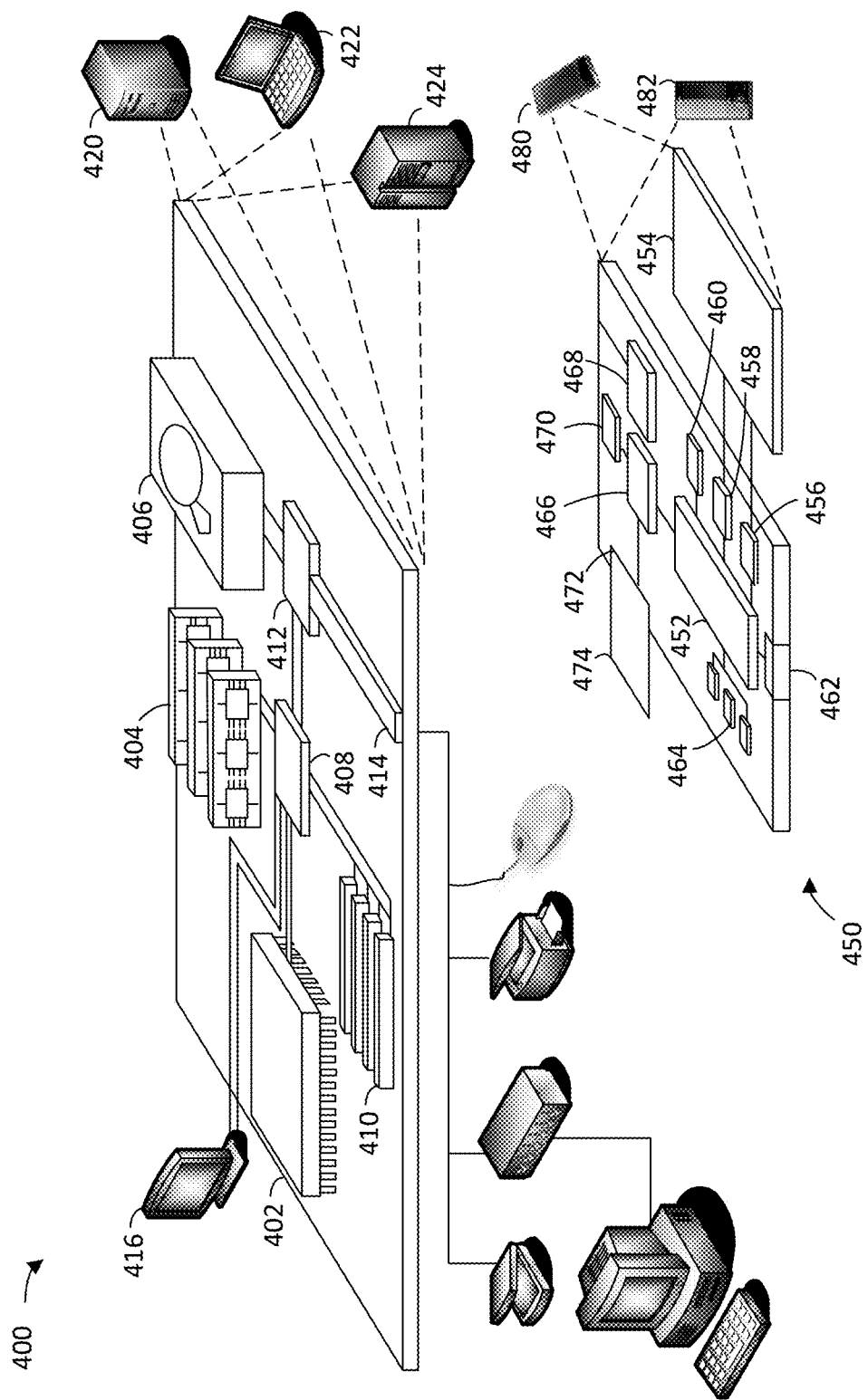
FIG. 4 shows an example of a generic computer device and a generic mobile computer device according to one or more implementations.

FIG. 4 shows an example of a generic computing device 400 and a generic mobile computing device 450, which may be used with the techniques described here. Generic computing device 400 and generic mobile computing device 450 may correspond to, for example, one or more of servers 305-350 and/or client 355. Computing device 400 is intended to represent various forms of digital computers, such as laptops, desktops, workstations, personal digital assistants, servers, blade servers, mainframes, and other appropriate computers. Mobile computing device 450 is intended to represent various forms of mobile devices, such as personal digital assistants, cellular telephones, smart phones, and other similar computing devices. The components shown in FIG. 4, their connections and relationships, and their functions, are meant to be examples only, and are not meant to limit implementations of the inventions described and/or claimed in this document.

Computing device 400 may include a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. Processor 402 can process instructions for execution within the computing device 400, including instructions stored in the memory 404 or on the storage device 406 to display graphical information for a graphical user interface ("GUI") on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations, e.g., as a server bank, a group of blade servers, or a multi-processor system, etc.

Memory 404 stores information within the computing device 400. In one implementation, memory 404 includes a volatile memory unit or units. In another implementation, memory 404 includes a non-volatile memory unit or units. The memory 404 may also be another form of computer-readable medium, such as a magnetic or optical disk. A computer-readable medium may be defined as a non-transitory memory device. A memory device may include space within a single physical memory device or spread across multiple physical memory devices.

The storage device 406 is capable of providing mass storage for the computing device 400. In one implementation, storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 404, storage device 406, or memory on processor 402.

High speed controller 408 manages bandwidth-intensive operations for the computing device 400, while low speed controller 412 manages lower bandwidth-intensive operations. Such allocation of functions is exemplary only. In one implementation, high-speed controller 408 is coupled to memory 404, display 416—e.g., through a graphics processor or accelerator—and to high-speed expansion ports 410, which may accept various expansion cards. In this implementation, low-speed controller 412 is coupled to storage device 406 and low-speed expansion port 414. The low-speed expansion port, which may include various communication ports—e.g., USB, Bluetooth, Ethernet, wireless Ethernet—may be coupled to one or more input/output devices, such as a keyboard, a pointing device, a scanner, or a networking device such as a switch or router, e.g., through a network adapter.

Computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device, such as mobile computing device 450. Each of such devices may contain one or more of computing devices 400, 450, and an entire system may be made up of multiple computing devices 400, 450 communicating with each other.

Mobile computing device 450 may include a processor 452, memory 464, an input/output ("I/O") device such as a display 454, a communication interface 466, and a transceiver 468, among other components. Mobile computing device 450 may also be provided with a storage device, such as a micro-drive or other device, to provide additional storage. Each of the components 450, 452, 464, 454, 466, and 468 are interconnected using various buses, and several of the components may be mounted on a common motherboard or in other manners as appropriate.

Processor 452 can execute instructions within mobile computing device 450, including instructions stored in memory 464. Processor 452 may be implemented as a chipset of chips that include separate and multiple analog and digital processors. Processor 452 may provide, for example, for coordination of the other components of mobile computing device 450, such as control of user interfaces, applications run by mobile computing device 450, and wireless communication by mobile computing device 450.

Processor 452 may communicate with a user through control interface 458 and display interface 456 coupled to a display 454. Display 454 may be, for example, a TFT LCD (Thin-Film-Transistor Liquid Crystal Display) or an OLED (Organic Light Emitting Diode) display, or other appropriate display technology. Display interface 456 may comprise appropriate circuitry for driving display 454 to present graphical and other information to a user. Control interface 458 may receive commands from a user and convert them for submission to the processor 452. In addition, an external interface 462 may be provide in communication with processor 452, so as to enable near area communication of mobile computing device 450 with other devices. External interface 462 may provide, for example, for wired communication in some implementations, or for wireless communication in other implementations, and multiple interfaces may also be used.

Memory 464 stores information within mobile computing device 450. Memory 464 can be implemented as one or more of a computer-readable medium or media, a volatile memory unit or units, or a non-volatile memory unit or units. Expansion memory 474 may also be provided and connected to mobile computing device 450 through expansion interface 472, which may include, for example, a SIMM (Single In Line Memory Module) card interface. Such expansion memory 474 may provide extra storage space for device 450, or may also store applications or other information for mobile computing device 450. Specifically, expansion memory 474 may include instructions to carry out or supplement the processes described above, and may include secure information also. Thus, for example, expansion memory 474 may be provide as a security module for mobile computing device 450, and may be programmed with instructions that permit secure use of device 450. In addition, secure applications may be provided via the SIMM cards, along with additional information, such as placing identifying information on the SIMM card in a non-hackable manner.

Expansion memory 474 may include, for example, flash memory and/or NVRAM memory. In one implementation, a computer program product is tangibly embodied in an information carrier. The computer program product contains instructions that, when executed, perform one or more methods, such as those described above. The information carrier is a computer-or machine-readable medium, such as the memory 464, expansion memory 474, or memory on processor 452, that may be received, for example, over transceiver 468 or external interface 462.

Mobile computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver. In addition, GPS (Global Positioning System) receiver module 470 may provide additional navigation- and location-related wireless data to mobile computing device 450, which may be used as appropriate by applications running on mobile computing device 450.

Mobile computing device 450 may also communicate audibly using audio codec 460, which may receive spoken information from a user and convert it to usable digital information. Audio codec 460 may likewise generate audible sound for a user, such as through a speaker, e.g., in a handset of mobile computing device 450. Such sound may include sound from voice telephone calls, may include recorded sound, such as voice messages, music files, etc., and may also include sound generated by applications operating on mobile computing device 450.

Mobile computing device 450 may be implemented in a number of different forms, as shown in the figure. For example, it may be implemented as a cellular telephone 480. It may also be implemented as part of a smart phone 482, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, may include machine instructions for a programmable processor, and can be implemented in a high-level procedural and/or object-oriented programming language, and/or in assembly/machine language. As used herein, the terms "machine-readable medium" "computer-readable medium" refers to any apparatus and/or device, such as magnetic discs, optical disks, memory, Programmable Logic Devices ("PLDs"), etc., used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The systems and techniques described herein can be implemented in a computing system that includes a back end component, e.g., as a data server, or that includes a middleware component, e.g., an application server, or that includes a front end component e.g., a client computer having a graphical user interface or a Web browser through which a user can interact with an implementation of the systems and techniques described here, or any combination of such back end, middleware, or front end components. The components of the system can be interconnected by any form or medium of digital data communication, such as a communication network. Examples of communication networks include a local area network ("LAN"), a wide area network ("WAN"), and the Internet.

Figure 5:
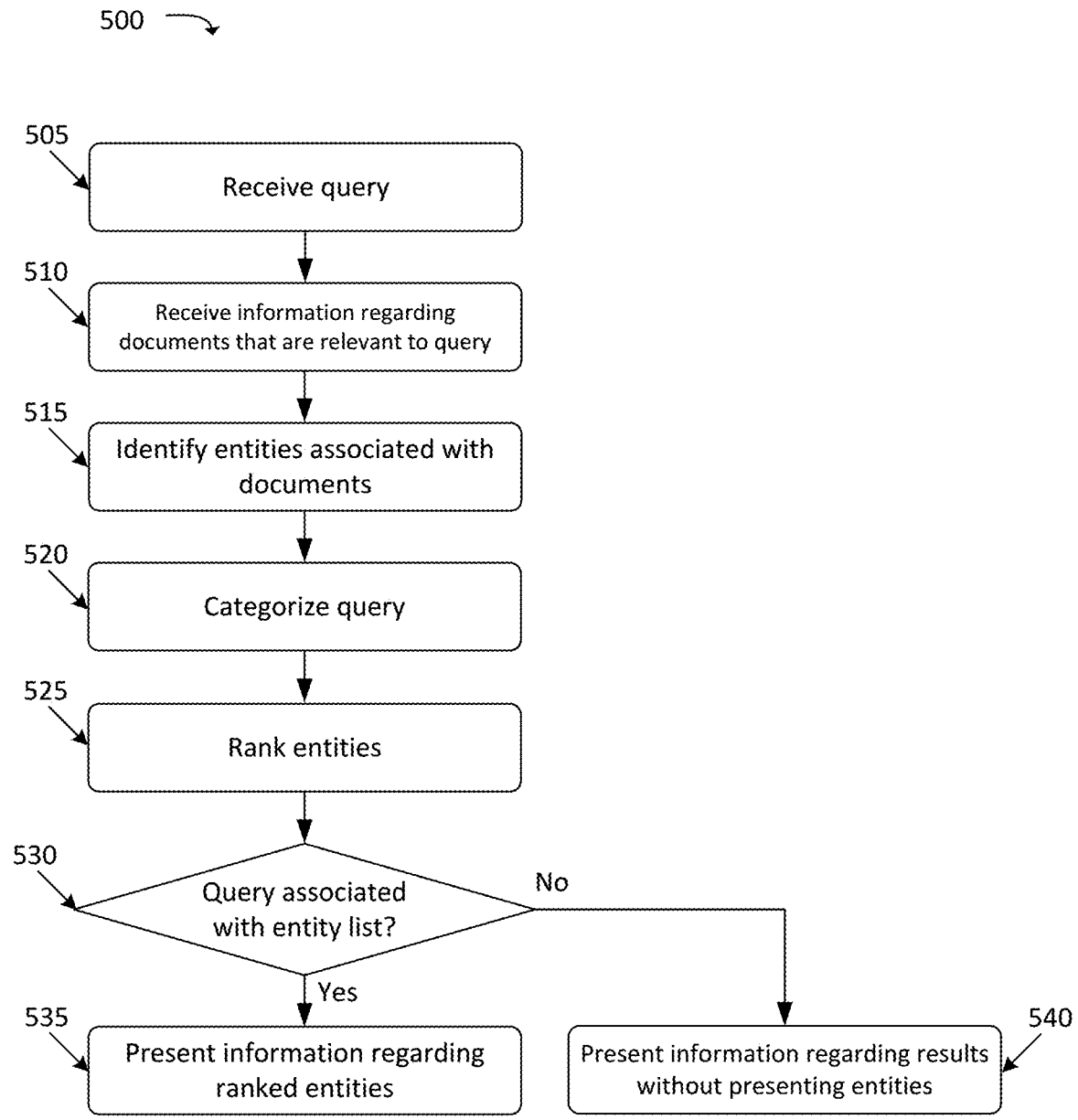
FIG. 5 illustrates a flowchart of an example process for presenting a ranked list of entities, according to one or more implementations described herein.

FIG. 5 illustrates a flowchart of an example process 500 for presenting a ranked list of entities. In one implementation, process 500 may be performed by one or more of servers 305-350. In another implementation, process 500 may be performed by one or more other components instead of, or possibly in conjunction with, servers 305-350.

Process 500 may include receiving a query (block 505). For example, server 305 may receive a query from a client, such as client 355. Referring back to FIG. 1A, the query may include, for example, the phrase "best movies of 2010." Process 500 may also include receiving information regarding documents that are relevant to the query (block 510). For example, server 305 may receive information regarding a set of documents, from server 307, that are relevant to the query. As discussed above, these documents may include a set of web results—e.g., documents that are relevant to the phrase "best movies of 2010."

Additionally, or alternatively, server 305 may receive the query from one or more other components. For example, server 305 may receive the query from a query log that stores one or more past queries that have been submitted by clients. Additionally, or alternatively, server 305 may receive the query from a component that generates queries based on, e.g., popular terms in search queries and/or search results over a particular period of time, popular topics in search queries and/or search results over a particular period of time, or the like.

Process 500 may further include identifying entities associated with the documents (block 515). For example, as discussed above with respect to entity extraction engine 210, server 310 may analyze the received documents to identify entities associated with the documents. As further discussed above, in order to identify the entities, server 310 may compare terms included in the results to terms stored by server 315. For example, server 310 may identify entities associated with the movies "Toy Story 3," "Inception," and "The Social Network."

Process 500 may additionally include categorizing the query (block 520). For example, as discussed above with respect to category identification engine 220, server 320 may identify a category associated with the query. Continuing with the example discussed above, server 320 may identify that the query is associated with a "movies" category. Process 600, described below with respect to FIG. 6, further describes categorizing the query, according to one implementation.

Process 500 may include ranking the entities (block 525). Process 800, described below with respect to FIG. 8, further describes ranking the entities, according to one implementation.

Process 500 may also include determining whether the query is associated with an entity list (block 530). For example, as discussed above with respect to list trigger engine 240, server 340 may determine whether the query "top movies of 2010" is associated with an entity list. Process 700, described below with respect to FIG. 7, further describes determining whether the query is associated with an entity list, according to one implementation.

If the query is associated with an entity list (block 530—YES), process 500 may further include presenting information regarding the ranked entities (block 535). For example, as discussed above with respect to search result document generation engine 245, server 345 may generate a search result document that includes information regarding the identified entities. The search result document may include some or all of the elements described above with respect to user interfaces 100 and/or 145. For example, the search result document may include images, links to web result documents, attribute information, etc., associated with one or more of the movies Toy Story 3, Inception, and/or The Social Network. Server 345 may provide the search result document to client 355, from which the query was received. Client 355 may present some, or all, of the search result document via a web browser. For example, the search result document may be presented via user interface 100, as shown in FIG. 1A.

Additionally, or alternatively, server 345 may store information associating some or all of the query with the ranked entities. Additionally, or alternatively, server 345 may provide the information associating some, or all, of the query with the ranked entities to a repository for storage and subsequent retrieval. For example, as described below with respect to FIG. 9, these ranked entities may be retrieved and presented when a query, that includes some, or all, of the query received at block 505, is received.

If, on the other hand, the category and/or the query are not associated with an entity list (block 530—NO), process 500 may include presenting information regarding results without presenting entities (block 540). For example, server 345 may generate a search result document that includes web results that are relevant to the query. For example, the search result document may include some or all of the information regarding the set of documents that are relevant to the query (received at block 510). In one implementation, this search result document may not include any information regarding entity lists. In such an example, this search result document may include some or all of the elements described above with respect to user interface 140.

Figure 6:
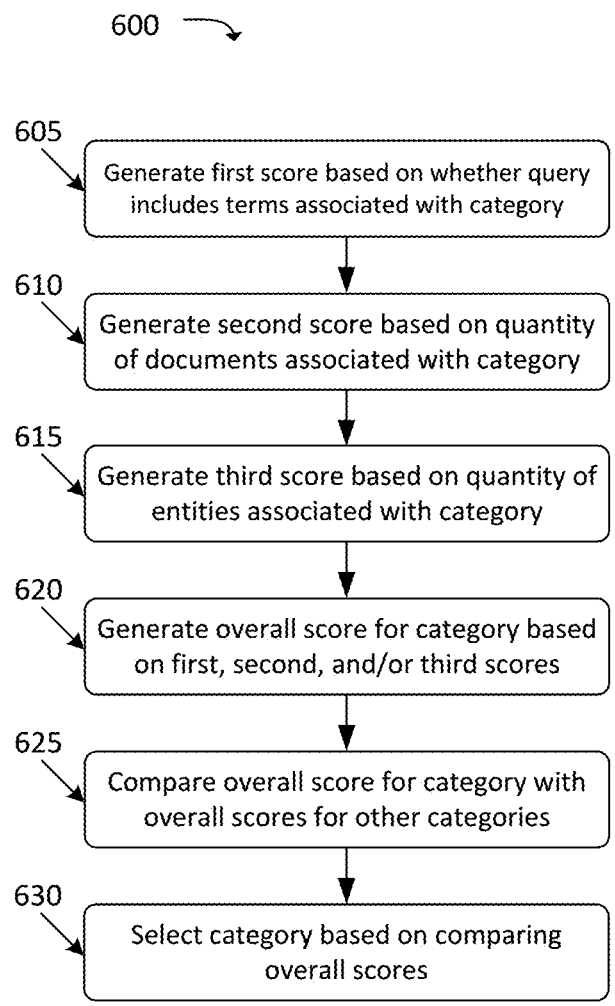
FIG. 6 illustrates a flowchart of an example process for selecting a category for a search query, according to one or more implementations described herein.

FIG. 6 illustrates a flowchart of an example process 600 for selecting a category for a search query. In one implementation, process 600 may be performed by server 320. In another implementation, process 600 may be performed by one or more other components instead of, or possibly in conjunction with, server 320. Furthermore, in one implementation, and as described above, process 600 may correspond to block 520 of process 500.

Process 600 may include generating one or more scores for each of one or more categories, and comparing the scores in order to select a category for the query. For example, for a particular category, process 600 may include generating a first score based on whether a query includes terms associated with the particular category (block 605). Server 320 may, for instance, receive category information from server 325. The category information may identify one or more terms that are associated with the particular category. For example, for a "movies" category, the category information may identify that terms "film," "films," "movie," and "movies" are associated with the "movies" category.

Server 320 may assign a first score, such as 1, 100, etc. when the query includes a term associated with the particular category. Server 320 may assign a different score, such as 0, when the query does not include a term associated with the particular category. In one implementation, server 320 may assign different scores to a particular category for different queries that include different quantities of terms associated with the particular category. For example, assume that a first query includes the terms "film" and "movie," while a second query includes the term "movie." In such an implementation, server 320 may assign a first score, such as 1.5, 2, 150, 200, etc., to the particular category for the first query, while assigning a second score, such as 1, 100, etc., to the particular category for the second query. Thus, in such an implementation, a query that includes multiple terms, associated with the particular category, may be associated with a higher score for the category than a score associated with a query that includes fewer terms associated with the particular category.

In another implementation, server 320 may assign the same score to a particular category for different queries that include different quantities of terms associated with the particular category. For example, assume that a first query includes the terms "film" and "movie," while a second query includes the term "movie." In such an implementation, server 320 may assign a score, such as 1, 100, etc., to the particular category for the first query, while assigning the same score to the particular category for the second query.

Additionally, or alternatively, the category information may identify that different terms are associated with different weights. For example, the category information may identify that the term "movie" is associated with a weight of 1.0, while the term "film" is associated with a weight of 0.8. In such an example, a query that includes the term "movie" may be associated with a score of 100 for the particular category, while a query that includes the term "film" may be associated with a score of 80 for the particular category.

Process 600 may further include generating a second score based on a quantity of documents associated with the particular category (block 610). For example, as discussed above with respect to entity ranking engine 220, server 320 may determine a quantity and/or proportion of documents, of the documents identified at block 510, that are associated with the particular category. Additionally, or alternatively, server 320 may determine a quantity and/or proportion of documents, of a subset of the documents identified at block 510, that are associated with the particular category. In one implementation, the subset of documents may include only the x most relevant documents, where x is a particular integer, such as 5, 10, 50, 100, etc. That is, the subset may include only the x documents, of the documents identified at block 510, that are most relevant to the query. In one implementation, x may equal 1. In such an implementation, the second score may be based on whether the document, of the documents identified at block 510, that is most relevant to the query, is associated with the particular category.

As also discussed above, server 320 may analyze a particular document to determine one or more topics associated with the particular document. Additionally, or alternatively, as also discussed above, server 320 may receive information identifying one or more topics associated with the particular document. Server 320 may identify, based on the identified topic, one or more categories associated with the particular document. Additionally, or alternatively, server 320 may receive information identifying one or more categories associated with the particular document.

Assume, for instance, that 75 documents, out of 100 documents identified at block 510, are associated with the "movies" category. In one implementation, server 320 may generate the second score based on the identifying that 75% of the documents are associated with the "movies" category. Additionally, or alternatively, server 320 may generate the second score based on identifying that 75 documents are associated with the "movies" category. That is, in such an implementation, server 320 may generate the second score based on the quantity of documents that are associated with the "movies" category, as opposed to the proportion of documents that are associated with the "movies" category.

Process 600 may also include generating a third score based on a quantity of entities associated with the particular category (block 615). For example, as discussed above, server 320 may determine a quantity and/or proportion of entities, of the entities identified at block 515, that are associated with the particular category. As also discussed above, in order to identify the category associated with a particular entity, server 320 may receive an identification of one or more categories associated with the entity from server 315.

Assume, for instance, that 85 entities, out of 100 entities identified at block 515, are associated with the "movies" category. In one implementation, server 320 may generate the third score based on the identifying that 85% of the entities are associated with the "movies" category. Additionally, or alternatively, server 320 may generate the third score based on identifying that 85 entities (rather than 85% of the entities) are associated with the "movies" category.

Process 600 may additionally include generating an overall score for the particular category based on the first, second, and/or third scores (block 620). Server 320 may generate the overall score by, for example, averaging two or more of the scores generated at blocks 605-615, adding two or more of the scores generated at blocks 605-615, multiplying two or more of the scores generated at blocks 605-615, or via any function that is based on one or more of the scores generated at blocks 605-615. In one implementation, server 320 may generate the overall score based on all of the scores generated at blocks 605-615. In another implementation, server 320 may generate the overall score based on fewer than all of the scores generated at blocks 605-615.

Furthermore, when generating the overall score, one or more of the scores at blocks 605-615 may be weighted more heavily than one or more other scores generated at blocks 605-615. In one implementation, these weights may be automatically generated and/or adjusted.

Process 600 may further include comparing the overall score for the particular category with overall scores for other categories (block 625). For example, server 320 may compare the overall score for the particular category (generated at block 620) with overall scores for other categories. The overall scores for other categories may be generated by server 320 by one or more other iterations of one or more of blocks 605-620 for the other categories. For example, assume that for a particular set of documents, server 320 may have generated (at block 620) an overall score for a "movies" category, and an overall score for a "books" category.

Process 600 may also include selecting a category based on comparing the overall scores (block 630). Continuing with the above example, server 320 may compare the overall scores for, for example, the "movies" and "books" categories, and select the category that is associated with the higher score.

While process 600 was described above as including blocks 605-630 in one implementation, other implementations may include fewer blocks, additional blocks, or different blocks. For example, in one implementation, process 600 may not include one or more of blocks 605-615. In such an implementation, process 600 may include generating (at block 620) an overall score that is not based on one or more of the first, second, or third scores.

Figure 7:
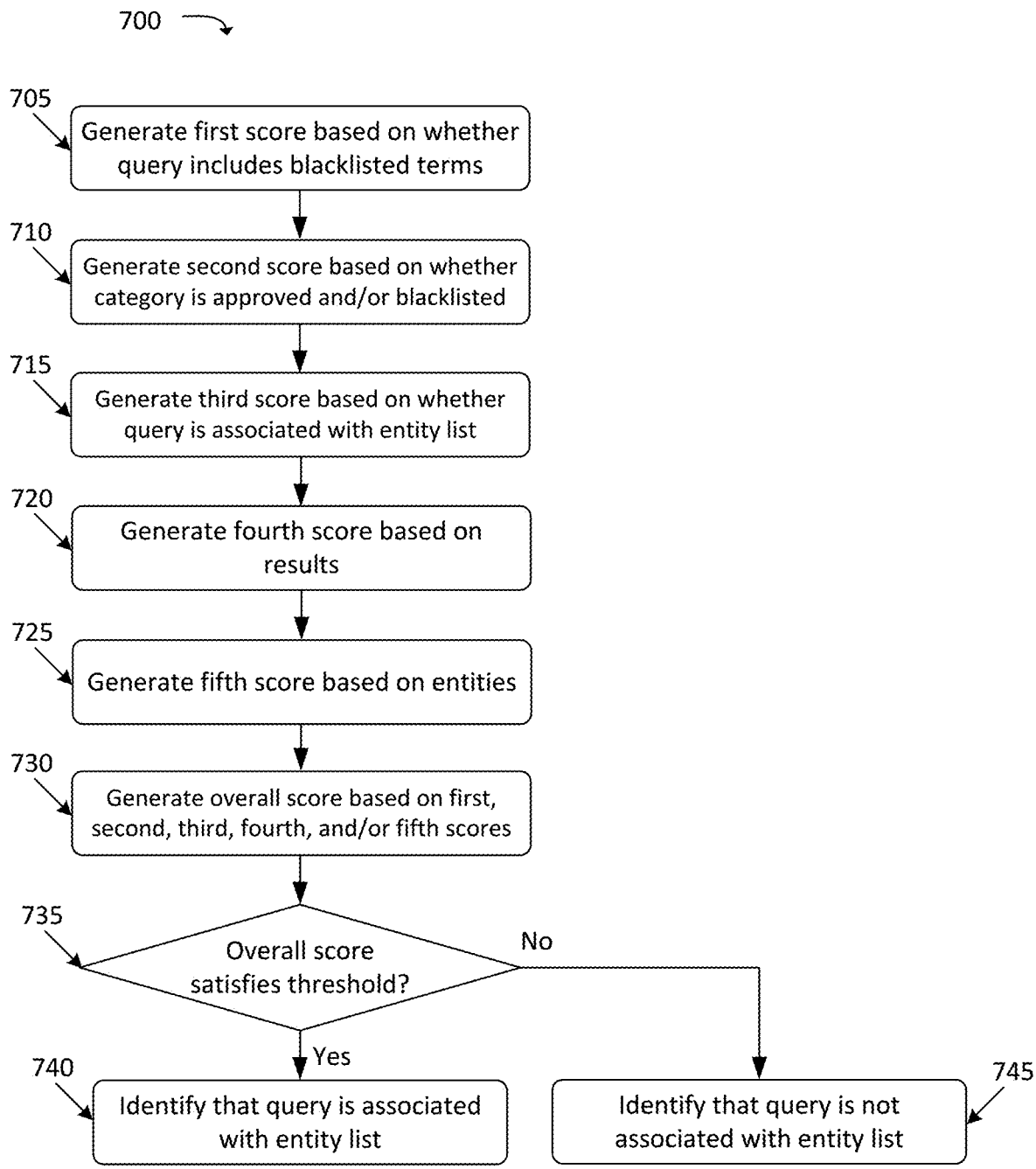
FIG. 7 illustrates a flowchart of an example process for determining whether a search query, associated with a category, is associated with an entity list, according to one or more implementations described herein.

FIG. 7 illustrates a flowchart of an example process 700 for determining whether a query, associated with a category, is associated with an entity list. In one implementation, process 700 may be performed by server 340. In another implementation, process 700 may be performed by one or more other components instead of, or possibly in conjunction with, server 340. Furthermore, in one implementation, and as described above, process 700 may correspond to block 530 of process 500.

Process 700 may include generating a first score based on whether a query includes one or more blacklisted terms (block 705). For example, as described above with respect to list trigger engine 240, server 340 may receive information identifying one or more blacklisted terms from server 342. Assume, for example, that the information identifies that the word "porn" is a blacklisted term, and that a query, such as the query received at block 505, includes the word "porn." In this situation, the first score, generated by server 340, may be a value that reflects that the query includes a blacklisted word, such as 0. Assume, in another example, that the query does not include a blacklisted term. In this example, the first score, generated by server 340, may be a value that reflects that the query does not include a blacklisted word, such as 1, 100, etc.

Additionally, or alternatively, the information may identify that different blacklisted terms are associated with different weights. For example, the information may identify that the word "porn" is associated with a weight of 1.0, while the term "adult" is associated with a weight of 0.3. In such an example, a query that includes the word "porn" may be associated with a first score of 100, while a query that includes the term "adult" may be associated with a first score of 30.

Process 700 may further include generating a second score based on whether the category is an approved and/or blacklisted category (block 710). For example, as described above with respect to list trigger engine 240, server 340 may receive information identifying one or more approved and/or blacklisted categories from server 342. Server 340 may determine whether a category, such as the category identified at block 520, is associated with an approved category and/or a blacklisted category.

Assume, for example, that server 340 receives information identifying "books" and "movies" as approved categories, and "pornographic DVDs" as a blacklisted category. Further assume, in a first example, that the category identified at block 520 is "pornographic DVDs." In this example, the second score, generated by server 340, may be a value that reflects that the category is associated with a blacklisted category, such as 0. Assume, in a second example, that the category identified at block 520 is "movies." In this situation, the second score, generated by server 340, may be a value that reflects that the category is associated with an approved category, such as 1, 100, etc.

Assume, in a third example, that the category identified at block 520 is "cars." In this situation, the second score, generated by server 340, may be a value that reflects that the category is not associated with a blacklisted category or an approved category. In one implementation, this second score may be a value that is between the values that would be assigned to blacklisted categories and approved categories, such as 0.5, 50, etc. In another implementation, this second score may be a value that is identical to a value that is assigned to blacklisted categories, such as 0. In yet another implementation, this second score may be a value that is identical to a value that is assigned to approved categories, such as 1, 100, etc.

Additionally, or alternatively, the information may identify that different approved and/or blacklisted categories are associated with different weights. For example, the information may identify that the word "pornographic DVDs" is associated with a weight of 0, while the term "cars" is associated with a weight of 0.3. In such an example, if the category identified at block 520 is "pornographic DVD's," the second score may be 0, while if the category identified at block 520 is "cars," the second score may be 30.

Process 700 may additionally include generating a third score based on whether a query is associated with entity lists (block 715). For example, as described above with respect to list trigger engine 240, server 340 may receive information identifying one or more terms that are associated with entity lists. Assume, for example, that server 340 receives information identifying that the terms "top," "of 2010," "best," "best of," and "list" are associated with entity lists.

Further assume, in a first example, that a query, such as the query received at block 505, includes the phrase "top movies of 2010." In this situation, the third score, generated by server 340, may be a value that reflects that the query includes a term that is associated with entity lists, such as 1, 100, etc. Assume, in a second example, that the query does not include any terms associated with entity lists. In this situation, the third score, generated by server 340, may be a value that reflects that the query does not include a term that is associated with entity lists, such as 0.

Additionally, or alternatively, the information may identify that different list terms are associated with different weights. For example, the information may identify that the word "top" is associated with a weight of 1.0, while the word "best" is associated with a weight of 0.8. In such an example, a query that includes the word "top" may be associated with a third score of 100, while a query that includes the word "best" may be associated with a third score of 80.

Process 700 may additionally include generating a fourth score based on results, such as the documents identified at block 510 (block 720). For example, as described above with respect to list trigger engine 240, server 340 may determine whether information regarding at least a threshold quantity of documents was received by server 305. In such an implementation, assume that information regarding at least the threshold quantity of documents was received. In this example, the fourth score may be 1, 100, or any other value that indicates that information regarding at least the threshold quantity of documents was received. In another example, assume that information regarding at least the threshold quantity of documents was not received. In this example, the fourth score may be 0, or any other value that indicates that information regarding at least the threshold quantity of documents was not received.

Additionally, or alternatively, server 340 may determine whether at least a threshold quantity of the documents are associated with a particular category, such as the category identified at block 520. In such an implementation, assume that at least the threshold quantity of documents is associated with the particular category. In this example, the fourth score may be 1, 100, or any other value that indicates that at least the threshold quantity of documents is associated with the particular category. In another example, assume that at least the threshold quantity of documents is not associated with the particular category. In this example, the fourth score may be 0, or any other value that indicates at least the threshold quantity of documents is not associated with the particular category.

In one implementation, server 340 may determine whether at least a threshold quantity of the documents, out of a particular quantity of the top documents, e.g., the documents with the highest relevance to the query received at block 505, are associated with the particular category. For example, assume that the set of documents includes 1,000 documents, and further assume that the threshold quantity is 50. In this implementation, server 340 may determine whether at least 50 documents, out of the 75 most relevant documents, are associated with the particular category. In this example, the fourth score may be 1, 100, or any other value that indicates that at least the threshold quantity of documents, out of the top 75 documents, is associated with the particular category. In another example, assume that at least the threshold quantity of documents, out of the top 75 documents, is not associated with the particular category. In this example, the fourth score may be 0, or any other value that indicates at least the threshold quantity of documents, out of the top 75 documents, is not associated with the particular category.

While example quantities were discussed here for the purpose of the preceding example, any quantities are possible in practice. In one implementation, one or more of the above-described quantities are static. In other words, in such an example, the threshold quantity and/or the particular quantity of top documents may be independent of the quantity of documents identified. In another implementation, one or more of the above-described quantities are based on the quantity of documents identified. For example, assume that information regarding 1,000 documents was received at block 510. In this example, server 340 may determine whether at least 50 documents, out of the 75 most relevant documents, are associated with the particular category. Assume, in another example, that information regarding 2,000 documents was received at block 510. In this example, server 340 may determine whether at least a different quantity of documents, such as 80, 100, 120, etc., out of another quantity of most relevant documents, such as 120, 150, 160, etc., are associated with the particular category.

Process 700 may additionally include generating a fifth score based on entities, such as the entities identified at block 515 and/or the entities ranked at block 525 (block 725). For example, as described above with respect to list trigger engine 240, server 340 may determine whether at least a threshold quantity of entities was identified by server 310. In such an implementation, assume that at least the threshold quantity of entities was identified. In this example, the fifth score may be 1, 100, or any other value that indicates that at least the threshold quantity of entities was identified. In another example, assume that at least the threshold quantity of entities was not identified. In this example, the fifth score may be 0, or any other value that indicates that at least the threshold quantity of entities was not identified.

Additionally, or alternatively, server 340 may determine whether at least a threshold quantity of the entities are associated with a particular category, such as the category identified at block 520. In such an implementation, assume that at least the threshold quantity of entities are associated with the particular category. In this example, the fifth score may be 1, 100, or any other value that indicates that at least the threshold quantity of entities are associated with the particular category. In another example, assume that at least the threshold quantity of entities are not associated with the particular category. In this example, the fifth score may be 0, or any other value that indicates at least the threshold quantity of entities are not associated with the particular category.

In one implementation, server 340 may determine whether at least a threshold quantity of the entities, out of a particular quantity of the top entities, e.g., the highest-ranked entities, as ranked by server 330, are associated with the particular category. For example, assume that the set of ranked entities, ranked by server 330, includes 1,000 entities, and further assume that the threshold quantity is 50. In this implementation, server 340 may determine whether at least 50 entities, out of the 75 highest-ranking entities, are associated with the particular category. In this example, the fifth score may be 1, 100, or any other value that indicates that at least the threshold quantity of entities, out of the 75 highest-ranked entities, is associated with the particular category. In another example, assume that at least the threshold quantity of entities, out of the 75 highest-ranked entities, is not associated with the particular category. In this example, the fifth score may be 0, or any other value that indicates at least the threshold quantity of entities, out of the 75 highest-ranking entities, is not associated with the particular category.

While example quantities were discussed here for the purpose of the preceding example, any quantities are possible in practice. In one implementation, one or more of the above-described quantities are static. In other words, in such an example, the threshold quantity and/or the particular quantity of highest-ranking entities may be independent of the quantity of entities identified. In another implementation, one or more of the above-described quantities are based on the quantity of entities identified. For example, assume that 1,000 entities were ranked at block 525. In this example, server 340 may determine whether at least 50 entities, out of the 75 highest-ranking entities, are associated with the particular category. Assume, in another example, that 2,000 entities were ranked at block 525. In this example, server 340 may determine whether at least a different quantity of entities, such as 80, 100, 120, etc., out of another quantity of highest-ranking entities, such as 120, 150, 160, etc., are associated with the particular category.

Process 700 may also include generating an overall score based on the first, second, third, fourth, and/or fifth scores (block 730). Server 340 may generate the overall score by, for example, averaging two or more of the scores generated at blocks 705-725, adding two or more of the scores generated at blocks 705-725, multiplying two or more of the scores generated at blocks 705-725, or via any function that is based on one or more of the scores generated at blocks 705-725. In one implementation, server 340 may generate the overall score based on all of the scores generated at blocks 705-725. In another implementation, server 340 may generate the overall score based on fewer than all of the scores generated at blocks 705-725.

Furthermore, when generating the overall score, one or more of the scores at blocks 705-725 may be weighted more heavily than one or more other scores generated at blocks 705-725. In one implementation, these weights may be automatically generated and/or adjusted.

Process 700 may further include determining whether the overall score satisfies a threshold score (block 735). If the overall score satisfies the threshold score (block 735—YES), then process 700 may include identifying that the query is associated with an entity list (block 740). If, on the other hand, the overall score does not satisfy the threshold (block 735—NO), then process 700 may include identifying that the query is not associated with an entity list (block 745).

While process 700 was described above as including blocks 705-745 in one implementation, other implementations may include fewer blocks, additional blocks, or different blocks. For example, in one implementation, process 700 may not include one or more of blocks 705-725. In such an implementation, process 700 may include generating (at block 730) an overall score that is not based on one or more of the first, second, third, fourth, and/or fifth scores.

Figure 8:
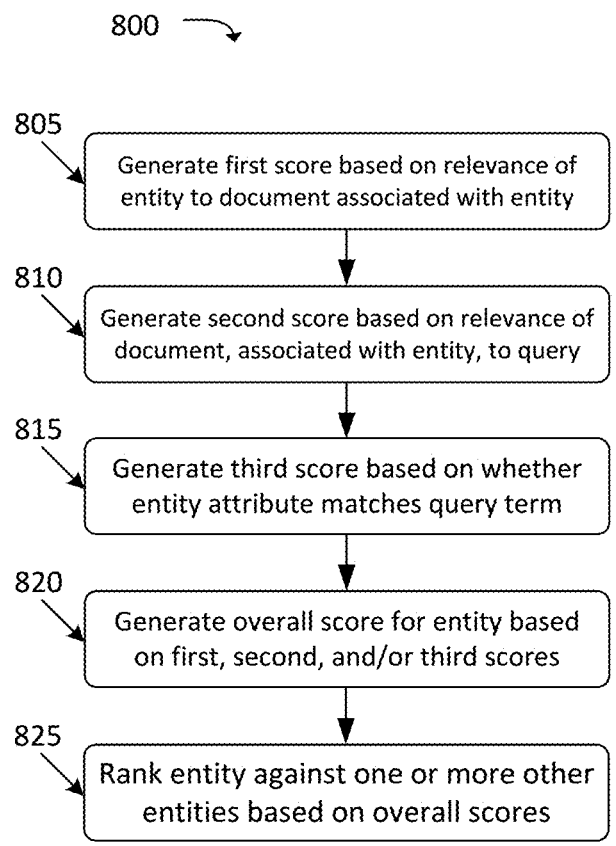
FIG. 8 illustrates a flowchart of an example process for ranking entities.

FIG. 8 illustrates a flowchart of an example process 800 for ranking entities. In one implementation, process 800 may be performed by server 330. In another implementation, process 800 may be performed by one or more other components instead of, or possibly in conjunction with, server 330. Furthermore, in one implementation, and as described above, process 800 may correspond to block 525 of process 500.

Process 800 may include generating a first score for a particular entity based on a relevance of the entity to a document associated with the entity (block 805). For example, as discussed above with respect to entity ranking engine 230, server 330 may determine the relevance of the particular entity to a document, from which the entity was identified at block 515, based on a topic associated with the document.

Assume, for example, that a first entity associated with the movie Toy Story 3 is identified from a document with a topic relating to "football," while a second entity associated with the movie Inception is identified from a document with a topic relating to "movies." Server 330 may determine that the first score for the first entity is lower than first score for the second entity, since the relevance of the first entity to the document from which the first document was identified is lower than the relevance of the second entity to the document from which the second document was identified.

Process 800 may also include generating a second score based on a relevance of a document, associated with the particular entity, to a query (block 810). For example, as discussed above with respect to entity ranking engine 230, server 330 may determine the relevance of the document to a query, such as the query received at block 505.

Assume, for example, that a particular entity is identified from a particular document at block 515. Further assume that the particular document was identified, at block 510, in response to the query received at block 505. Server 330 may determine, or receive information identifying, a relevance of the particular document to the query. The second score, generated by server 330, may be based on the relevance of the particular document to the query.

Process 800 may further include generating a third score based on whether an attribute, associated with the entity, matches a query term (block 815). For example, as discussed above with respect to entity ranking engine 230, server 330 may receive information from server 335 identifying attributes associated with the particular entity. These attributes may include terms associated with information that is relevant to the particular entity.

For example, assume that one of the attributes includes the phrase "2010." Further assume, in one example, that the query includes the phrase "2010." In this situation, the third score, generated by server 330, may be 1, 100, or some other value that indicates that the query includes one or more terms of an attribute associated with the particular entity. Assume, in another example, that the query does not include any terms associated with the attributes. In this situation, the third score, generated by server 330, may be 0, or some other value that indicates that the query does not include a term of an attribute associated with the particular entity.

Process 800 may additionally include generating an overall score for the particular entity based on the first, second, and/or third scores (block 820). Server 330 may generate the overall score by, for example, averaging two or more of the scores generated at blocks 805-815, adding two or more of the scores generated at blocks 805-815, multiplying two or more of the scores generated at blocks 805-815, or via any function that is based on one or more of the scores generated at blocks 805-815.

In one implementation, one such function may involve generating a first score and a second score for each document associated with the entity, generating a fourth score for each of the documents based on the first and second scores, and adding the fourth scores for each of the documents to obtain the overall score. In one implementation, the fourth score for a particular document may be obtained by using the function: $S_1*\log(1+\min(S_2,C))$, where $S_1$ represents the first score for the particular document, $S_2$ represents the second score for the particular document, C represents a constant value, and min represents a function that selects a minimum value. In other implementations, other functions may be used. For example, in other implementations, the fourth score for a particular document may be obtained by using one or more of the following functions: $S_1*\log(1+S_2)$; $(S_1+S_2)/2$; or any other function.

In one implementation, server 330 may generate the overall score based on all of the scores generated at blocks 805-815. In another implementation, server 330 may generate the overall score based on fewer than all of the scores generated at blocks 805-815.

Furthermore, when generating the overall score, one or more of the scores at blocks 805-815 may be weighted more heavily than one or more other scores generated at blocks 805-815. In one implementation, these weights may be automatically generated and/or adjusted.

Process 800 may further include ranking the particular entity against one or more other entities based on the overall scores associated with the entities (block 825). For example, server 330 may compare the overall score for the particular entity (generated at block 820) with overall scores for other entities. The overall scores for other entities may be generated by server 330 through one or more other iterations of one or more of blocks 805-820 for the other entities. Server 330 may rank the particular entity against the other entities based on the respective overall scores for the particular entity and the other entities.

While process 800 was described above as including blocks 805-825 in one implementation, other implementations may include fewer blocks, additional blocks, or different blocks. For example, in one implementation, process 800 may not include one or more of blocks 805-815. In such an implementation, process 800 may include generating (at block 820) an overall score that is not based on one or more of the first, second, or third scores.

Figure 9:
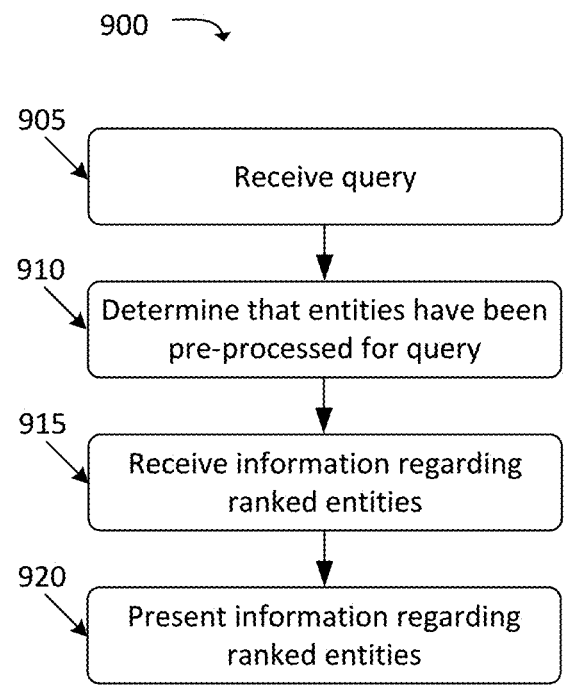
FIG. 9 illustrates a flowchart of an example process for presenting pre-processed ranked entities.

FIG. 9 illustrates a flowchart of an example process 900 for presenting pre-processed ranked entities. In one implementation, process 900 may be performed by one or more of servers 305, 345, and/or 350. In another implementation, process 900 may be performed by one or more other components instead of, or possibly in conjunction with, servers 305, 345, and/or 350.

Process 900 may include receiving a query (block 905). For example, server 305 may receive the query from a client, such as client 355. Process 900 may further include determining that entities have been pre-processed for the query (block 910). For example, server 305 may determine that server 350 includes information that associates some, or all of the query, with ranked entities. In making such a determination, server 305 may discard "stop" words, such as "and," "the," "or," "a," "an," etc., from the query received at block 905. Additionally, or alternatively, server 305 may determine a significance score of a particular phrase within the query received at block 905, and may determine information regarding the particular phrase is stored by server 350.

Process 900 may further include receiving information regarding ranked entities (block 915). For example, server 345 may receive information regarding the ranked entities, associated with the query received at block 905, from server 350. Process 900 may further include presenting information regarding the ranked entities (block 920). For example, server 345 may generate a search result document that includes information regarding the identified entities. The search result document may include some or all of the elements described above with respect to user interfaces 100 and/or 145. For example, the search result document may include images, links to web result documents, attribute information, etc., associated with one or more of the movies Toy Story 3, Inception, and/or The Social Network. In one implementation, the search result document may also include information regarding one or more web results. Server 345 may provide the search result document to client 355, from which the query was received. Client 355 may present some, or all, of the search result document via a web browser, such as CHROME'.

An implementation, described herein, may allow a search engine to present a list of entities in response to a query that is associated with entities. By presenting a list of entities, associated with a particular category, in response to a search query that is associated with the particular category, a search engine may more efficiently provide relevant information to a user. Additionally, a search engine may provide information, such as attribute information associated with the entities, in which the user is interested.

The foregoing description provides illustration and description, but is not intended to be exhaustive or to limit the implementations to the precise form disclosed. Modifications and variations are possible in light of the above description or may be acquired from practice of the implementations. For example, while series of blocks have been described with regard to FIGS. 5-9, the order of the blocks may be modified in other implementations. Further, non-dependent blocks may be performed in parallel.

Furthermore, while scores are discussed above as being raised, lowered, above thresholds, below thresholds, etc., other implementations may employ the techniques described above while treating scores differently than described above. For example, in one implementation, scores may be increased by various factors, such as at blocks 605-615 of FIG. 6. In another implementation, scores may be decreased based on the same factors. Additionally, in one implementation, a determination may be made of whether a score is above a threshold, e.g., at block 735 of FIG. 7. Other implementations may include determining whether the score is below a threshold.

Additionally, while various scores are described above as being based on whether a first term matches a second term, any or all of these scores may additionally, or alternatively, be based on a confidence that the first term matches, or is related to, the second term. For example, block 705 is described above as generating a first score based on whether a query includes blacklisted terms. In one implementation, the first score may be based on a relevance of terms of the query to one or more blacklisted terms. Additionally, or alternatively, the first score may be based on a distance, such as a semantic distance, of the terms of the query to one or more of the blacklisted terms. The first score may be based on the relevance of the terms of the query to the blacklisted terms, the distance of the terms of the query to the blacklisted terms, or the like.

Further still, while some scores are described above as being based on whether a particular value satisfies particular threshold quantity, some or all of these scores may be based on a closeness of the particular value to the particular threshold quantity. For example, assume that the particular threshold quantity is 1,000, and the particular quantity is 1,200. In such an example, a particular score may be 1.1, 1.2, 1.3, 110, 120, 130, or any other value that is based on a closeness of 1,200 to 1,000. In another example, assume that the threshold quantity is 1,000, and the particular quantity is 800. In such an example, the particular score may be 0.7, 0.8, 0.9, 70, 80, 90, or any other value that is based on a closeness of 800 to 1,000. In one implementation, the closeness may be calculated via a linear function. In another implementation, the closeness may be calculated via any other type of function, such as a logarithmic function, an exponential decay function, etc.

Furthermore, in one implementation, a particular value may satisfy a particular threshold value by exceeding the particular threshold value. In another implementation, a particular value may satisfy a particular threshold value by equaling or exceeding the particular threshold value. In yet another implementation, a particular value may satisfy a particular threshold value by being below the particular threshold value. In still another implementation, a particular value may satisfy a particular threshold value by equaling or being below the particular threshold value.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method performed by one or more computers, the method comprising:
   storing data indicating one or more list terms that, when included in a search query, indicate that the search query is associated with an entity list, each list term specifying a list criterion of an entity list;
   receiving search queries that include one or more search query terms, and for each search query:
      determining, based on the one or more search query terms, whether the received search query is associated with an entity list, wherein the determination is based on comparing the one or more search query terms included in the received search query with the one or more list terms;
   for each search query that is not determined to be associated with an entity list, providing, for output on a user device, web search results that are relevant to the search query;
   for each search query that is determined to be associated with an entity list:
      determining, based on the one or more search query terms, a particular category of entities that is associated with the received search query;
      providing, for output on the user device, web search results that are relevant to the search query; and
      providing, for output on the user device, data indicating entities in an entity list for the particular category of entities that is associated with the received search query, the data causing the user device to present the entities in a list format that is separate from the web search results and provided concurrently with the web search results.

2. The method of claim 1, wherein receiving the search query that includes one or more search query terms comprises:
   receiving spoken information that includes the one or more search query terms; and
   converting the spoken information into digital information.

3. The method of claim 1, wherein comparing the one or more search query terms included in the received search query with the one or more list terms includes comparing the one or more search query terms to a phrase that comprises a preposition and a year.

4. The method of claim 1, wherein comparing the one or more search query terms included in the received search query with the one or more list terms includes comparing the one or more search query terms to a phrase that comprises a preposition and an adjective.

5. The method of claim 1, wherein providing, for output on a user device, data indicating entities from an entity list for the particular category of entities that is associated with the received search query comprises:
   generating audible sounds representing the entities from the entity list for the particular category of entities; and
   outputting the generated audible sounds through a speaker of the user device.

6. A system comprising:
   one or more computers and one or more non-transitory storage devices storing instructions that are operable, when executed by one or more computers, to cause the one or more computers to perform operations comprising:
      storing data indicating one or more list terms that, when included in a search query, indicate that the search query is associated with an entity list, each list term specifying a list criterion of an entity list;
      receiving search queries that include one or more search query terms, and for each search query:
         determining, based on the one or more search query terms, whether the received search query is associated with an entity list, wherein the determination is based on comparing the one or more search query terms included in the received search query with the one or more list terms;
      for each search query that is not determined to be associated with an entity list, providing, for output on a user device, web search results that are relevant to the search query;
      for each search query that is determined to be associated with an entity list:
         determining, based on the one or more search query terms, a particular category of entities that is associated with the received search query;
         providing, for output on the user device, web search results that are relevant to the search query; and
         providing, for output on the user device, data indicating entities in an entity list for the particular category of entities that is associated with the received search query, the data causing the user device to present the entities in a list format that is separate from the web search results and provided concurrently with the web search results.

7. The system of claim 6, wherein receiving the search query that includes one or more search query terms comprises:
   receiving spoken information that includes the one or more search query terms; and
   converting the spoken information into digital information.

8. The system of claim 6, wherein comparing the one or more search query terms included in the received search query with the one or more list terms includes comparing the one or more search query terms to a phrase that comprises a preposition and a year.

9. The system of claim 6, wherein comparing the one or more search query terms included in the received search query with the one or more list terms includes comparing the one or more search query terms to a phrase that comprises a preposition and an adjective.

10. The system of claim 6, wherein providing, for output on a user device, data indicating entities from an entity list for the particular category of entities that is associated with the received search query comprises:

generating audible sounds representing the entities from the entity list for the particular category of entities; and outputting the generated audible sounds through a speaker of the user device.

11. A non-transitory computer-readable storage device having stored thereon instructions, which, when executed by data processing apparatus, cause the data processing apparatus to perform operations comprising:

storing data indicating one or more list terms that, when included in a search query, indicate that the search query is associated with an entity list, each list term specifying a list criterion of an entity list;

receiving search queries that include one or more search query terms, and for each search query:

determining, based on the one or more search query terms, whether the received search query is associated with an entity list, wherein the determination is based on comparing the one or more search query terms included in the received search query with the one or more list terms;

for each search query that is not determined to be associated with an entity list, providing, for output on a user device, web search results that are relevant to the search query;

for each search query that is determined to be associated with an entity list:

determining, based on the one or more search query terms, a particular category of entities that is associated with the received search query;

providing, for output on the user device, web search results that are relevant to the search query; and providing, for output on the user device, data indicating entities in an entity list for the particular category of entities that is associated with the received search query, the data causing the user device to present the entities in a list format that is separate from the web search results and provided concurrently with the web search results.

12. The computer-readable storage device of claim 11, wherein receiving the search query that includes one or more search query terms comprises:

receiving spoken information that includes the one or more search query terms; and converting the spoken information into digital information.

13. The computer-readable storage device of claim 11, wherein comparing the one or more search query terms included in the received search query with the one or more list terms includes comparing the one or more search query terms to a phrase that comprises a preposition and a year.

14. The computer-readable storage device of claim 11, wherein comparing the one or more search query terms included in the received search query with the one or more list terms includes comparing the one or more search query terms to a phrase that comprises a preposition and an adjective.

15. The computer-readable storage device of claim 11, wherein providing, for output on a user device, data indicating entities from an entity list for the particular category of entities that is associated with the received search query comprises:

generating audible sounds representing the entities from the entity list for the particular category of entities; and outputting the generated audible sounds through a speaker of the user device.

* * * * *

UNITED STATES PATENT AND TRADEMARK OFFICE
CERTIFICATE OF CORRECTION

Page 1 of 1

PATENT NO. : 10,691,702 B1
APPLICATION NO. : 15/692772
DATED : June 23, 2020
INVENTOR(S) : Fujiki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 286 days.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*